United States Patent Office.

JOHN CARNRICK, OF NEW YORK, N. Y.

MEDICINAL EMULSION.

SPECIFICATION forming part of Letters Patent No. 327,231, dated September 29, 1885.

Application filed February 4, 1885. (No specimens.) Patented in England May 1, 1884, No. 7,110.

*To all whom it may concern:*

Be it known that I, JOHN CARNRICK, of New York, in the county of New York and State of New York, have invented certain new and useful Improvements in Nutritive and Medicinal Emulsions or Compositions; and I do hereby declare that the following is a full, clear, and exact description of the invention, which will enable others skilled in the art to which it appertains to make and use the same.

This invention relates to nutritive or medicinal compositions or emulsions; and its object is to provide an emulsion which is agreeable in appearance and taste and possessed of highly nutritive and invigorating qualities, and suitable for use in cases of debility and in all cases in which a physician would properly prescribe a readily digestible and assimilable nutritive.

The essential ingredients of my improved emulsion or composition of matter are cod-liver oil, milk, and pancreatine, and preferably gum or its equivalent to assist in preserving the union of the oil and milk in the permanent form of an emulsion. The ingredients are mixed together in suitable proportions, which may vary within wide limits—as, for instance, twenty to eighty parts of the oil with eighty to twenty parts of milk, by volume, and, say, one-quarter ounce of commercial pancreatine to the gallon of the mingled oil and milk. The milk used in the emulsion may previously be reduced to one-half (more or less) of its volume by removing a portion of the water by evaporation. The proportions of the milk and oil which I prefer are equal parts by volume of cod-liver oil and of the milk reduced by evaporation as above. The pancreatine digests a portion of the fatty components of the cod-liver oil and of the milk, so that the emulsion is readily assimilated even by persons of unusually weak digestion.

In preparing the emulsion I mix together preferably about equal quantities of cod-liver oil and of the milk reduced by evaporation, and add the requisite proportion of pancreatine and, preferably, say, two ounces of gum-arabic or its equivalent to a pint, these being mixed in the usual manner of preparing emulsions.

The use of milk, especially concentrated milk, in the emulsion possesses important advantages over water, ordinarily used, for with milk the emulsion is more easily formed, and, besides, the milk contains all the necessary constituents to maintain healthy nutrition, and is therefore a valuable aid to the oil as a nutritive agent; and the artificial digestion of a part of the fatty matter in the composition renders the latter more easily assimilable when the composition is taken as food or medicine by the digestive organs, and therefore better suited to persons with weak or sensitive digestive organs. The thus pancreatinized emulsion is quite palatable, is in an excellent form for digestion, and is readily assimilated.

The pancreatine used is preferably dissolved in glycerine previous to its mixture with the oil and milk. The glycerine assists in maintaining the union of the cod-liver oil and milk, and also acts as a preservative.

The milk and oil may be digested with the pancreatine separately or together; or only one of them may be digested with the pancreatine, as may be deemed expedient or desirable.

The gum or its equivalent may, if desired, be omitted; but its use is to be preferred, as it assists in maintaining the permanence of the emulsion for a longer period than may ordinarily be experienced with an emulsion of the pancreatinized oil and milk without such assistance.

My said emulsion may be used in conjunction or at the same time with other nutritive or medicinal substances.

I am aware that emulsions of cod-liver oil with digestive ferments are not new; and also that pancreatic emulsion of cod-liver oil is not new, and that glycerine and hypophosphites have been added to such emulsions with gum as the suspending agent. Such, therefore, I do not claim; but

What I claim as my invention is—

As a new article of manufacture, a pancreatinized emulsion of cod-liver oil and milk, substantially as herein set forth.

In testimony that I claim the foregoing as my own I affixed my signature in presence of two witnesses.

JOHN CARNRICK.

Witnesses:
HENRY C. BANKS,
JOHN B. PERRY, Jr.